(12) United States Patent
Yamamoto et al.

(10) Patent No.: US 10,527,918 B2
(45) Date of Patent: Jan. 7, 2020

(54) IMAGE PROJECTION APPARATUS, CONTROL METHOD, AND STORAGE MEDIUM

(71) Applicant: CANON KABUSHIKI KAISHA, Tokyo (JP)

(72) Inventors: Hiroshi Yamamoto, Ageo (JP); Yuya Kurata, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/194,951

(22) Filed: Nov. 19, 2018

(65) Prior Publication Data

US 2019/0163042 A1 May 30, 2019

(30) Foreign Application Priority Data

Nov. 28, 2017 (JP) ................. 2017-227641

(51) Int. Cl.
*G03B 21/20* (2006.01)
(52) U.S. Cl.
CPC ......... *G03B 21/206* (2013.01); *G03B 21/204* (2013.01); *G03B 21/2066* (2013.01)
(58) Field of Classification Search
CPC ............... G02B 2207/113; G02B 27/283; G02B 27/10; G02B 5/30; G02B 5/32; G03B 21/006; G03B 21/142; G03B 21/204; G03B 21/2066; G03B 21/208; G03B 33/12; G03B 21/206; G03B 21/2033; G03B 21/2013; G03B 21/202; G03B 21/2053; G03B 21/2073; H04N 9/3155; H04N 9/3158; H04N 9/3182; H04N 9/3194; H04N 9/315; H04N 9/3152; H04N 9/3161; H04N 9/3164; H04N 9/3167; G01J 4/00;
(Continued)

(56) References Cited

U.S. PATENT DOCUMENTS 8,274,051 B1 * 9/2012 Aswell ................ G01J 3/513
250/338.4
9,888,220 B2 2/2018 Chikahisa
(Continued)

FOREIGN PATENT DOCUMENTS

JP 5593703 B2 9/2014
JP 2016005221 A 1/2016
JP 2016021014 A 2/2016

*Primary Examiner* — Renan Luque
(74) *Attorney, Agent, or Firm* — Rossi, Kimms & McDowell LLP

(57) ABSTRACT

An image projection apparatus includes a first light source configured to emit first light with a first wavelength band, a wavelength conversion element configured to convert part of the first light into wavelength-converted light with a wavelength band different from the first wavelength band and containing a second wavelength band, a second light source configured to emit second light with a wavelength band contained in the second wavelength band, a first measurement unit configured to measure a light quantity in a first measurement wavelength band as at least part of the second wavelength band, and an acquisition unit configured to acquire information on a light quantity of the first light and a light quantity of the second light by using a measurement result by the first measurement unit.

16 Claims, 11 Drawing Sheets

(58) Field of Classification Search
CPC . G01M 11/0257; G01N 21/958; G01Q 60/22; G02F 1/133528
See application file for complete search history.

(56) References Cited

U.S. PATENT DOCUMENTS

| | | | | |
|---|---|---|---|---|
| 2007/0182933 | A1* | 8/2007 | Sudo | G03B 21/14 353/20 |
| 2011/0309755 | A1* | 12/2011 | Wirth | H05B 33/0872 315/151 |
| 2012/0032600 | A1* | 2/2012 | Edwards | H05B 33/0869 315/151 |
| 2012/0062857 | A1* | 3/2012 | Saitou | G02B 5/22 353/98 |
| 2013/0300282 | A1* | 11/2013 | Mori | H01L 33/504 313/503 |
| 2014/0092320 | A1* | 4/2014 | Yamaguchi | G03B 33/12 349/5 |
| 2014/0103373 | A1* | 4/2014 | Li | H01L 33/502 257/88 |
| 2014/0375968 | A1* | 12/2014 | Tsuda | G03B 21/204 353/85 |
| 2016/0026076 | A1* | 1/2016 | Hu | G03B 21/204 353/84 |
| 2017/0322155 | A1* | 11/2017 | Drumm | F21S 41/14 |

* cited by examiner

IMAGE PROJECTION APPARATUS, CONTROL METHOD, AND STORAGE MEDIUM

BACKGROUND OF THE INVENTION

Field of the Invention

The present invention relates to an image projection apparatus (referred to as a "projector" hereinafter), a control method, and a storage medium.

Description of the Related Art

Some projectors guide to a light modulation element, such as a liquid crystal panel, illumination light that contains fluorescent light generated by irradiating excitation light from a laser diode (LD) onto a fluorescent material as a wavelength conversion element, and displays an image by projecting image light modulated by the light modulation element. One representative example of such a projector forms white light by combing blue light from a blue LD with yellow light as fluorescent light generated by irradiating the blue light as excitation light onto a fluorescent body. Many fluorescent bodies have a low fluorescent conversion efficiency in a red wavelength band. Hence, Japanese Patent Laid-Open No. 2016-21014 discloses a projector that includes a red light source, such as a red LD, in addition to a blue LD and a fluorescent body, and supplements the red light.

Since the deterioration speed is different between the blue LD and the red LD, a color balance of the image projected by the projector may be lost for a long time use. Japanese Patent No. 5593703 discloses a method of correcting a color balance when a blue LD deteriorates in a projector using the blue LD and the fluorescent body that generates the yellow fluorescent light. More specifically, this method corrects the color balance by gain-controlling the light modulation element based on the blue light quantity and the red light quantity measured by the light quantity monitor.

Where the blue LD and the fluorescent body emitting the yellow fluorescent light is combined with the red LED for supplementing the red light, it is necessary to distinguish the light quantity of the red light component in the yellow light from the fluorescent body from the red light quantity from the red LD. This is because the tone of the red light component contained in the fluorescent light and the tone of the light from the red LD are different from each other and therefore the color balance cannot be well corrected unless a reduced red light quantity caused by the deterioration of the red LD is accurately measured.

SUMMARY OF THE INVENTION

The present invention provides an image projection apparatus, a storage medium, and a storage medium, each of which can well correct a lost color balance caused by the deteriorated light source etc.

An image projection apparatus according to one aspect of the present invention is configured to project a projection image derived from modulated light. The image projection apparatus includes a first light source configured to emit first light with a first wavelength band, a wavelength conversion element configured to convert part of the first light into wavelength-converted light with a wavelength band different from the first wavelength band and containing a second wavelength band, a second light source configured to emit second light with a wavelength band contained in the second wavelength band, a first measurement unit configured to measure a light quantity in a first measurement wavelength band as at least part of the second wavelength band, and an acquisition unit configured to acquire information on a light quantity of the first light and a light quantity of the second light by using a measurement result by the first measurement unit.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
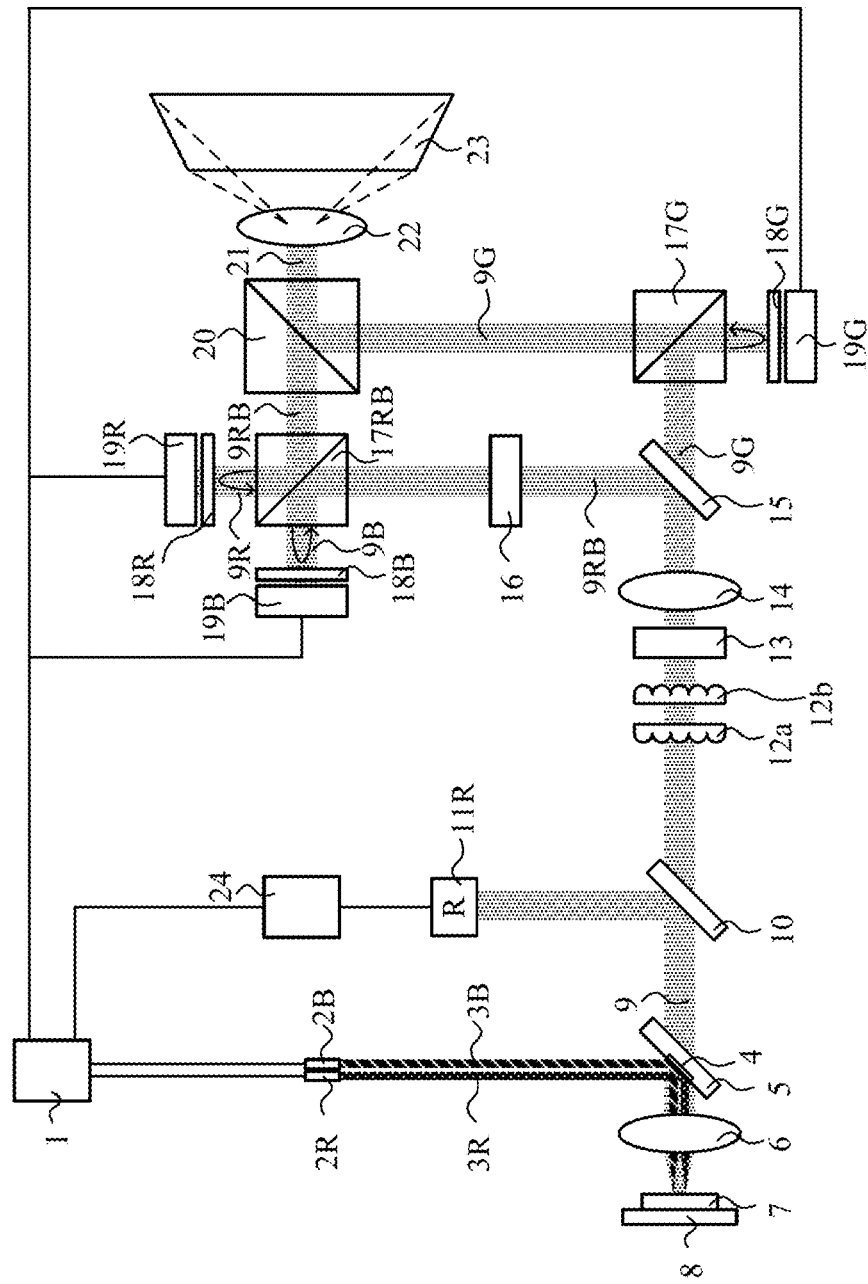
FIG. 1 illustrates a configuration of a projector according to a first embodiment of the present invention.

FIG. 1 illustrates a configuration of a projector as an image projection apparatus according to a first embodiment of the present invention. In the following description, R, G, and B stand for red, green and blue, respectively. The projector according to this embodiment includes a light source unit as a light source apparatus, an illumination light detector, and a projector optical system. In the light source unit, reference numeral 2B denotes a B light source (first light source), reference numeral 3B denotes B light (first light), reference numeral 2R denotes an R light source (second light source), and reference numeral 3R denotes R light. Reference numeral 4 denotes a light reflecting member or reflector, reference numeral 5 denotes a glass plate, and reference numeral 6 denotes a first lens. Reference numeral 7 denotes a fluorescent body as a wavelength conversion element, and reference numeral 8 denotes a fluorescent body supporting member. Reference numeral 9 denotes illumination light. In the illumination light detector, reference numeral 10 denotes an optical bifurcation (or branch) member, and reference numeral 11R denotes an R light measurement unit (first measurement unit).

In the projector optical system, reference numeral 12a denotes a first fly-eye lens, reference numeral 12b denotes a second fly-eye lens, reference numeral 13 denotes a polarization conversion element, reference numeral 14 denotes a second lens, reference numeral 15 denotes a dichroic mirror, and reference numeral 16 denotes a wavelength selective phase plate. Reference numeral 17RB denotes an RB polarization beam splitter, reference numeral 17G denotes a G polarization beam splitter, reference numeral 18R denotes an R quarter waveplate, reference numeral 18G denotes a G quarter waveplate, and reference numeral 18B denotes a B quarter waveplate. Reference numeral 19R denotes an R light modulation element, reference numeral 19G denotes a G light modulation element, reference numeral 19B a B light modulation element, and reference numeral 20 denotes a color combining prism. Reference numeral 21 denotes projection light, and reference numeral 22 denotes a projection lens.

The projector includes a controller 1. The controller 1 includes a microcomputer, such as a CPU, and controls the entire projector according to a computer program. The R light source 2R and the B light source 2B include semiconductor lasers. An LED may be used in place of the semiconductor laser. The R light source 2R has a peak wavelength of 640 nm, and the B light source 2B has a peak wavelength of 455 nm. The controller 1 controls an electrification to or driving or light emissions of the R light source 2R and the B light source 2B.

The R light 3R emitted from the R light source 2R and the B light 3B emitted from the B light source 2B are reflected by the light reflecting member 4 and applied to the fluorescent body 7 through the first lens 6. The light reflecting member 4 is provided only on a portion irradiated with the R light 3R and the B light 3B on the surface of the glass plate 5. The first lens 6 collects the R light 3R and the B light 3B and forms an irradiation region with a predetermined size of the R light 3R and the B light 3B on the fluorescent body 7.

The fluorescent body 7 is supported by the fluorescent body supporting member 8 as a substrate. The fluorescent body 7 wavelength-converts (fluorescence-converts) part of the B light 3B as excitation light to generate yellow light (referred to as "Y light" hereinafter) as wavelength-converted light (fluorescent light). The Y light has a wavelength band (second wavelength band) of the R light 3R and a wavelength band (third wavelength band) of the G light. On the other hand, the light not wavelength-converted by the fluorescent body 7 among the B light 3B is diffused and reflected as unconverted light by the fluorescent body 7 and the fluorescent body supporting member 8 and travels toward the first lens 6. The fluorescent body 7 according to this embodiment has a constant ratio of the light quantity of the B light 3B irradiated on the fluorescent body 7 to the light quantity of the converted light (Y light) generated by the wavelength conversion in the fluorescent body 7. The R light 3R is hardly wavelength-converted by the fluorescent body 7, is diffused and reflected, and travels toward the first lens 6.

The fluorescent body 7 is made of YAG: Ce or the like. The fluorescent body supporting member 8 may have a high rigidity and a high reflectance for the B light, the Y light, and the R light, and be likely to radiate the heat generated in the fluorescent body 7. Therefore, the fluorescent body supporting member 8 is typically made of a metal plate such as aluminum. However, it is not limited to the metal plate as long as it has the same function as the metal plate. In order to efficiently radiate the heat from the fluorescent body 7, the fluorescent body 7 and the fluorescent body supporting member 8 may be rotated by a motor or the like so that the irradiation region of the excitation light is not fixed to one place on the fluorescent body 7.

Combined light of the fluorescent light (Y light) from the fluorescent body 7 and the unconverted light (R light and B light) enters the first lens 6 as the illumination light 9. Then, the first lens 6 converts the illumination light 9 into parallel light.

The illumination light 9 that has transmitted through the first lens 6 passes through a portion of the glass plate 5 other than the light reflecting member 4. The projector optical system is designed so that the illumination light 9 that has transmitted through the glass plate 5 becomes white light. Part of the illumination light 9 that has transmitted through the glass plate 5 is bifurcated by the light dividing member 10 and received by the R light measurement unit 11R. The light dividing member 10 is formed, for example, of a flat glass. Anything may be used as long as part of the illumination light 9 can be bifurcated.

The illumination light 9 that has transmitted through the light dividing member 10 is divided into a plurality of light fluxes while passing through the first fly-eye lens 12a and the second fly-eye lens 12b, and enters the polarization conversion element 13. The polarization conversion element 13 converts the illumination light 9 as nonpolarized light into linearly polarized light having a polarization direction in one direction. In general, the light flux from the LD is linearly polarized light, but the light flux from the fluorescent body 7 is nonpolarized light whose polarization direction is disturbed. Therefore, in order for the polarization beam splitter described later to efficiently perform the polarization separation, the polarization conversion element 13 is provided to align the polarization direction with a predetermined direction. In this embodiment, the polarization conversion element converts the illumination light 9 into linearly polarized light (S-polarized light) having a polarization direction perpendicular to the paper plane of FIG. 1. The plurality of light fluxes as the illumination light 9 emitted from the polarization conversion element 13 are condensed by the second lens 14 and superimposed on each light modulation element (19R, 19G, 19B). Thereby, each light modulation element is uniformly illuminated.

The illumination light 9 that has transmitted through the second lens 14 is guided to the dichroic mirror 15. The dichroic mirror 15 reflects the RB light 9RB in the illumination light 9 and transmits the G light 9G. The G light 9G as the S-polarized light that has passed through the dichroic mirror 15 enters the G polarization beam splitter 17G, is reflected by its polarization splitting surface, passes through the G quarter waveplate 18G, and enters the G light modulation element 19G. The G light modulation element 19G, the R light modulation element 19R, and the B light modulation element 19B are reflection type liquid crystal display elements. The controller 1 controls each light modulation element.

The G light modulation element 19G image-modulates and reflects the G light 9G. After passing through the quarter waveplate 18G again, the S-polarized light component in the image-modulated G light is reflected by the polarization splitting surface in the G polarization beam splitter 17G, returned to the light source side, and removed from the projection light. On the other hand, the P-polarized light component in the image-modulated G light passes through the quarter waveplate 18G, then passes through the polarization splitting surface in the G polarization beam splitter 17G, and enters the color combining prism 20.

On the other hand, the RB light 9 RB reflected by the dichroic mirror 15 enters the wavelength selective phase plate 16. The wavelength selective phase plate 16 rotates the polarization direction of the R light by 90° to obtain the P-polarized light, and transmits the B light as the S-polarized light with the maintained polarization direction. The RB light 9RB that has transmitted through the wavelength selective phase plate 16 enters the RB polarization beam splitter 17RB. The RB polarization beam splitter 17RB transmits the R light 9R as the P-polarized light and reflects the B light 9B as the S-polarized light.

The R light 9R that has transmitted through the polarization splitting surface in the RB polarization beam splitter 17RB transmits through the quarter waveplate 18R and enters the R light modulating element 19R, which image-modulates and reflects it. After passing through the quarter waveplate 18R, the P-polarized light component in the image-modulated R light again transmits through the quarter waveplate 18R, then passes through the polarization splitting surface in the RB polarization beam splitter 17RB, is returned to the light source side, and is removed from the projection light. On the other hand, the S-polarized light component in the image-modulated R light passes through the quarter waveplate 18R, is reflected by the polarization splitting surface in the RB polarization beam splitter 17RB, and enters the color combining prism 20.

The B light 9B reflected by the polarization splitting surface in the RB polarization beam splitter 17RB transmits through the quarter waveplate 18B and enters the B light modulation element 19B, which image-modulates and reflects it. After passing through the quarter waveplate 18B again, the S-polarized light component in the image-modulated B light is reflected by the polarization splitting surface in the RB polarization beam splitter 17RB, returned to the light source side, and removed from the projection light. On the other hand, the P-polarized light component in the image-modulated R light passes through the quarter waveplate 18B, then passes through the polarization splitting surface in the RB polarization beam splitter 17RB, and enters the color combining prism 20.

The B light 9B and the R light 9R that have entered the color combining prism 20 pass through the dichroic surface, and the G light 9G that has entered the color combining prism 20 is reflected by the dichroic surface. The projection light 21 (B light 9B, R light 9R and G light 9G) color-combined in this way is projected onto a screen 23 as a projected surface via the projection lens 22. Thereby, a full color image as a projection image is displayed on the screen 23.

The above R light measurement unit 11R includes a photodiode having a function of measuring the intensity (or light quantity) of the R light in the illumination light 9. The R light measurement unit 11R can measure the light quantity with the wavelength band from 600 nm to 700 nm (first measurement wavelength band) as at least part of the R wavelength band. The light quantity is measured by the R light measurement unit 11R after the fluctuation of the output of each light source caused by the temperature change in the projector becomes sufficiently small. The measurement result by the R light measurement unit 11R is sent to the calculator (calculation unit, acquisition unit) 24. The calculator 24 includes a microcomputer, such as an MPU, performs a predetermined computation by using the measurement result from the R light measurement unit 11R, corrects or adjusts the color of the projection light 21 (or the projection image) according to the calculation result, and controls each light modulation element. More specifically, as will be described later, in order to adjust (correct) the color balance of the projection light 21, the calculator 24 controls the light modulation amount of the light modulation element.

Figure 2A:
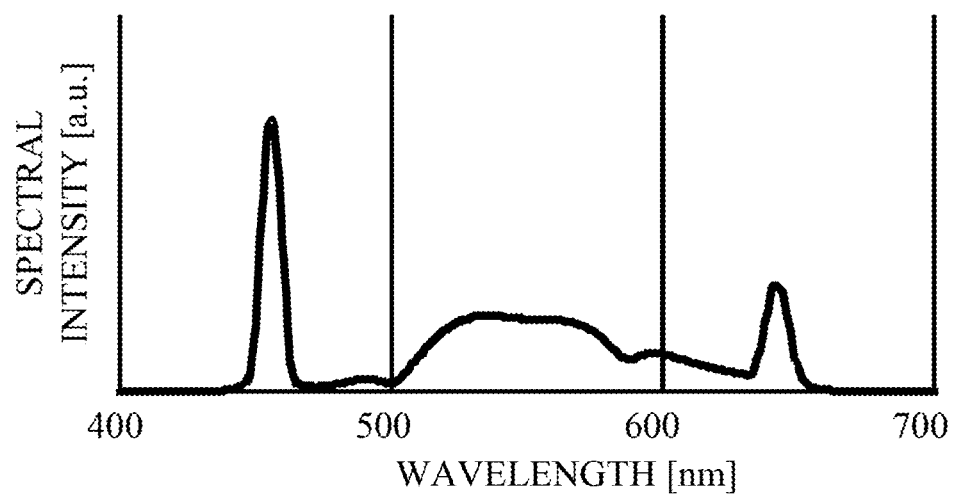
FIGS. 2A and 2B illustrate a spectrum of projection light according to the first embodiment.
Figure 2B:
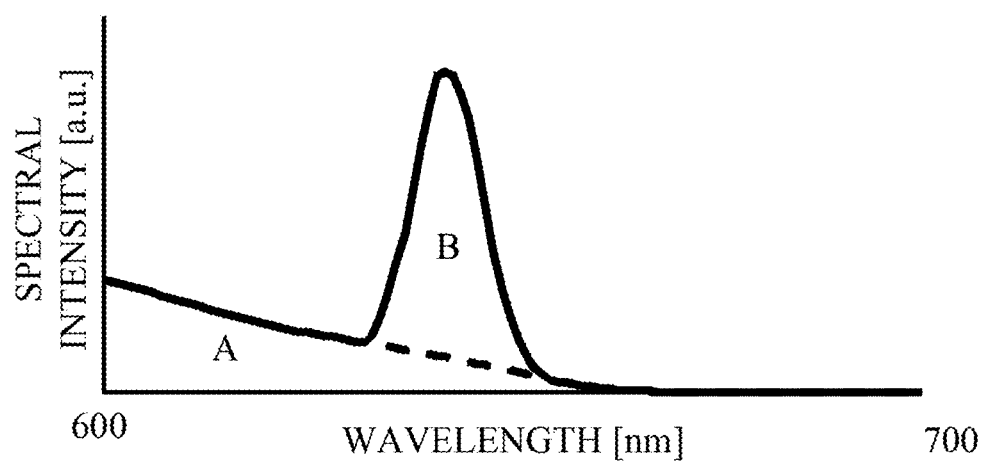

FIGS. 2A and 2B illustrate spectra in the projection light 21 when the controller 1 turns on both the R light source 2R and the B light source 2B (or instructs them to emit light) to display an all-white image on the screen 23. FIG. 2A illustrates a spectrum in the wavelength band from 400 nm to 700 nm. FIG. 2B illustrates a spectrum in the wavelength band from 600 nm to 700 nm that can be measured by the R light measurement unit 11R. "A portion" under a dotted line in FIG. 2B illustrates the R light component (referred to as "fluorescent R light" hereinafter) contained in the fluorescence light wavelength-converted by the fluorescent body 7, and "B portion" above the dotted line illustrates the R light source 2R (referred to as "light source R light" hereinafter).

The R light measurement unit 11R that includes the photodiode can measure the integrated value of the spectrum illustrated in FIG. 2B, but cannot distinguish the A portion the B portion from each other in the measurement. Since the R tone of the A portion and the R tone of the B portion are different from each other, the color balance of the projection light cannot be well (accurately) corrected only by using the integrated values of the portions A and B.

Figure 3:
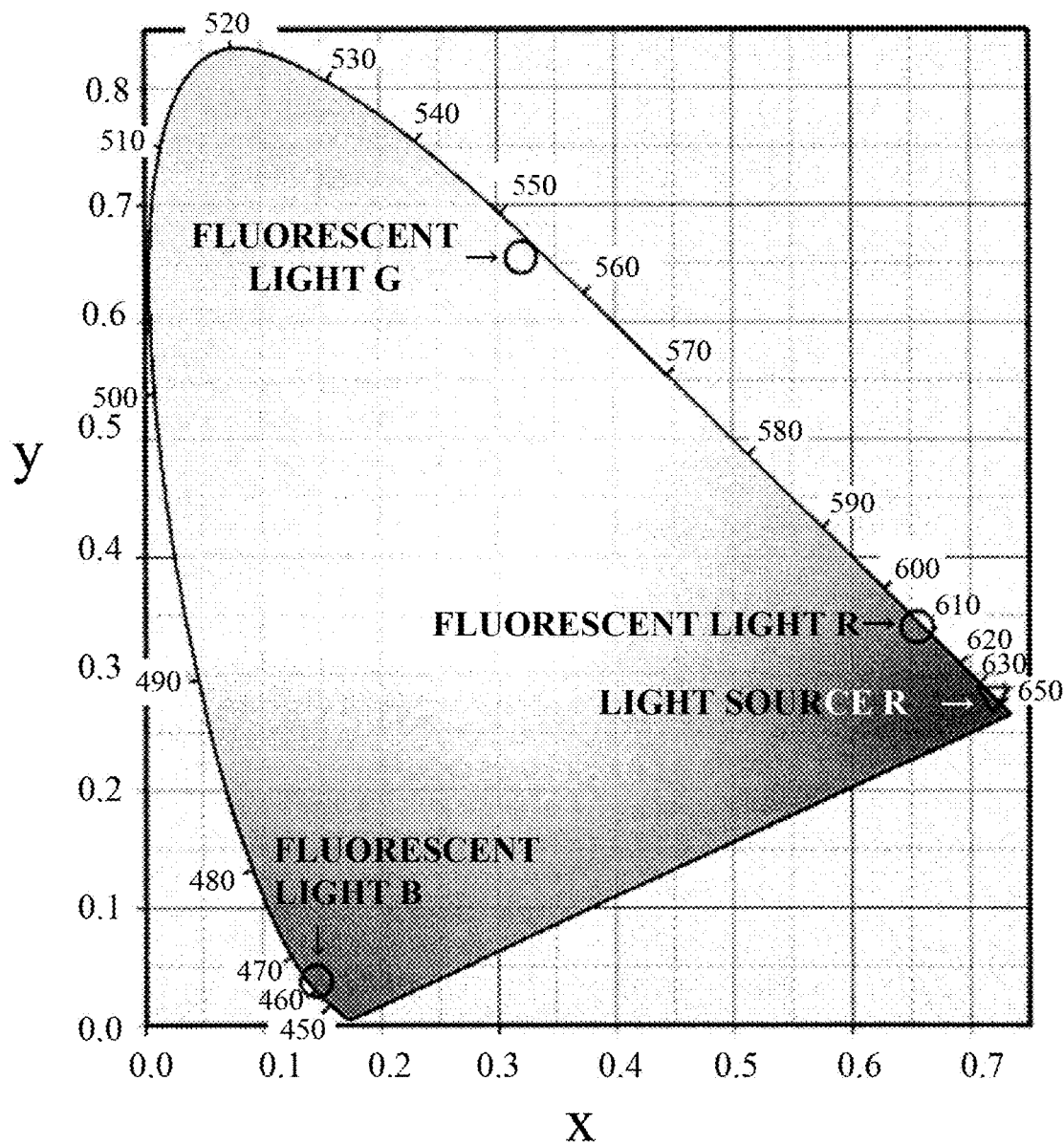
FIG. 3 is a chromaticity diagram for explaining the color in the projection light according to the first embodiment.

FIG. 3 is an xy chromaticity diagram. The chromaticity coordinate indicated by a circle in FIG. 3 represents chromaticity coordinates of B as the B light from the fluorescent light (B light source) (referred to as "fluorescent B light" hereinafter) in the projection light 21, G as the G light contained in the fluorescent light from the fluorescent body 7 (referred to as "fluorescent G light" hereinafter), and R as the light source R light and R as the fluorescent R light. Herein, the fluorescent B, G and R light is contained in the projection light 21 when the B light source 2B is turned on and the R light source 2R is not turned on (or is turned off). The light source R light is the R light contained in the projection light 21 when the R light source 2R is turned on and the B light source 2B is not turned on (or is turned off). As illustrated in FIG. 3, R as the fluorescent R light and R as the light source R light have chromaticity coordinates different from each other. Thus, in order to correct the color balance of the projection light 21, it is necessary to distinguish the light quantity of the fluorescent R light and the light quantity of the light source R light from each other.

Figure 4:
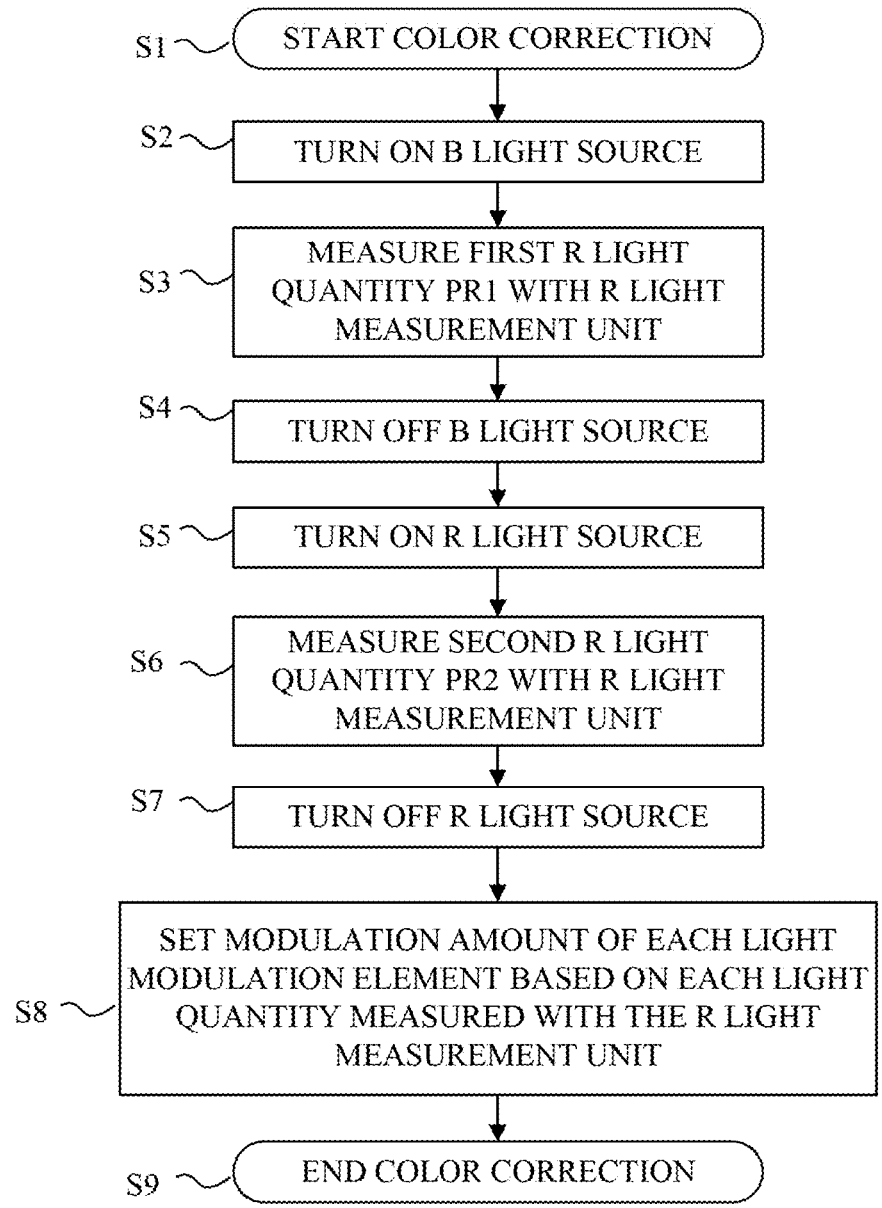
FIG. 4 is a flowchart of processing performed by the projector according to the first embodiment.

Hence, the projector (the controller 1 and the calculator 24) according to this embodiment performs the color correction processing illustrated in a flowchart of FIG. 4 for separately measuring the light quantity of the A portion and the light quantity of the B portion. The controller 1 and the calculator 24 execute this processing according to a control program as a computer program. This also applies to other embodiments described later.

In the step 1, the controller 1 starts color correction processing. The timing at which the controller 1 performs the step 1 may be determined by the user or may be a predetermined timing. The step1 may be performed all the time when the projector runs.

Next, in the step 2, the controller 1 turns on the B light source 2B and turns off the R light source 2R.

Next, in the step 3, the controller 1 instructs the R light measurement unit 11R to measure a first R light quantity PR1 as the light quantity of the R light. The first R light quantity PR1 corresponds to the A portion in FIG. 2B.

Next, in the step 4, the controller 1 turns off the B light source 2B. Next, in the step 5, the controller 1 turns on the R light source 2R and turns off the B light source 2B.

Next, in the step 6, the controller 1 instructs the R light measurement unit 11R to measure a second R light quantity PR2 as the light quantity of the R light. The second R light quantity PR2 corresponds to the B portion in FIG. 2B.

Next, in the step 7, the controller 1 turns off the R light source 2R. However, the subsequent processing can follow while the R light source is turned on without performing the step 7. This also applies to other embodiments described later.

Next, in the step 8, the calculator 24 sets the light modulation amount of each light modulation element by using the first R light quantity PR1 and the second R light quantity PR2, as the measurement results by the R light measurement unit 11R. Then, in the step 9, the controller 1 ends the color correction processing.

A detailed description will be given of processing in which the calculator 24 sets the light modulation amount of each light modulation element in the step 8 in FIG. 4. As described above, this embodiment has a constant ratio of the light quantity of the B light 3B (referred to as "B light quantity" hereinafter) applied to the fluorescent body 7 to the light quantity of the fluorescent light generated by the fluorescent body 7. Therefore, the projection light 21 has a constant ratio among the B light quantity, the G light quantity (referred to as a "G light quantity" hereinafter) and the R light quantity (referred to as a "fluorescent R light quantity" hereinafter) generated by the wavelength conversion of the B light 3B. Since the fluorescent R light quantity is proportional to the first R light quantity PR1, the calculator 24 calculates the B light quantity, the G light quantity, and the fluorescence R light quantity contained in the projection light 21 by multiplying the R light quantity PR1 by the predetermined proportionality factor. The calculator 24 saves (stores) the proportionality factor in advance. The proportionality factor may be obtained from a designed value or may be obtained by the actual measurement.

Using the second R light quantity PR2, the calculator 24 calculates the B light quantity, the G light quantity, the fluorescence R light quantity, and the R light quantity from the R light source 2R non-wavelength-converted by the fluorescent body 7 (referred to as "light source R light quantity" hereinafter). Thus, the calculator 24 acquires information on the fluorescence R light quantity and the light source R light quantity. Herein, the information on the fluorescent R light quantity and the light source R light quantity (simply referred to as "information on the light quantity" hereinafter) may be information on the respective light quantities themselves or information on the ratio or ratio between both light quantities.

Then, using the calculation result (information on the light quantity), the calculator 24 sets the light modulation amount of each light modulation unit so that the projection light 21 has the target color balance. For example, when the projector is used for a long time, the deterioration degrees of the B light source 2B and the R light source 2R are different from each other. When the R light source 2R is degraded earlier than the B light source 2B, B and G become excessive relative to R in the color balance of the projection light 21. Therefore, the calculator 24 reduces the light modulation mounts of the G light modulation element 19G and the B light modulation element 19B, thereby achieving white color balance.

Conversely, when the B light source 2B deteriorates earlier than the R light source 2R, R becomes excessive relative to B and G in the color balance of the projection light 21. Hence, the calculator 24 reduces the light modulation amount by the R light modulation element 19R for the white color balance. This embodiment can well adjust (correct) the color balance of the projection light 21, even when the B light source 2B and the R light source 2R have different deterioration speeds.

This embodiment describes the R light measurement unit 11R making a measurement when the B or R light source is turned on or off, but may change a drive current value (electrification amount) of each light source without completely turning off each light source in the measurement by the R light measurement unit 11R. In other words, the calculator 24 performs a first measurement that instructs the R light measurement unit 11R to measure the light quantity while both the B and R light sources 2B and 2R emit light through the electrifications. The calculator 24 performs a second measurement that instructs the R light measurement unit 11R to measure the light quantity when the electrification amount to at least one of the B and R light sources 2B and 2R is different from that in the first measurement. Then, the calculator 24 acquires the information on the light quantity from the measurement results of the first and second measurements.

Second Embodiment

Figure 5:
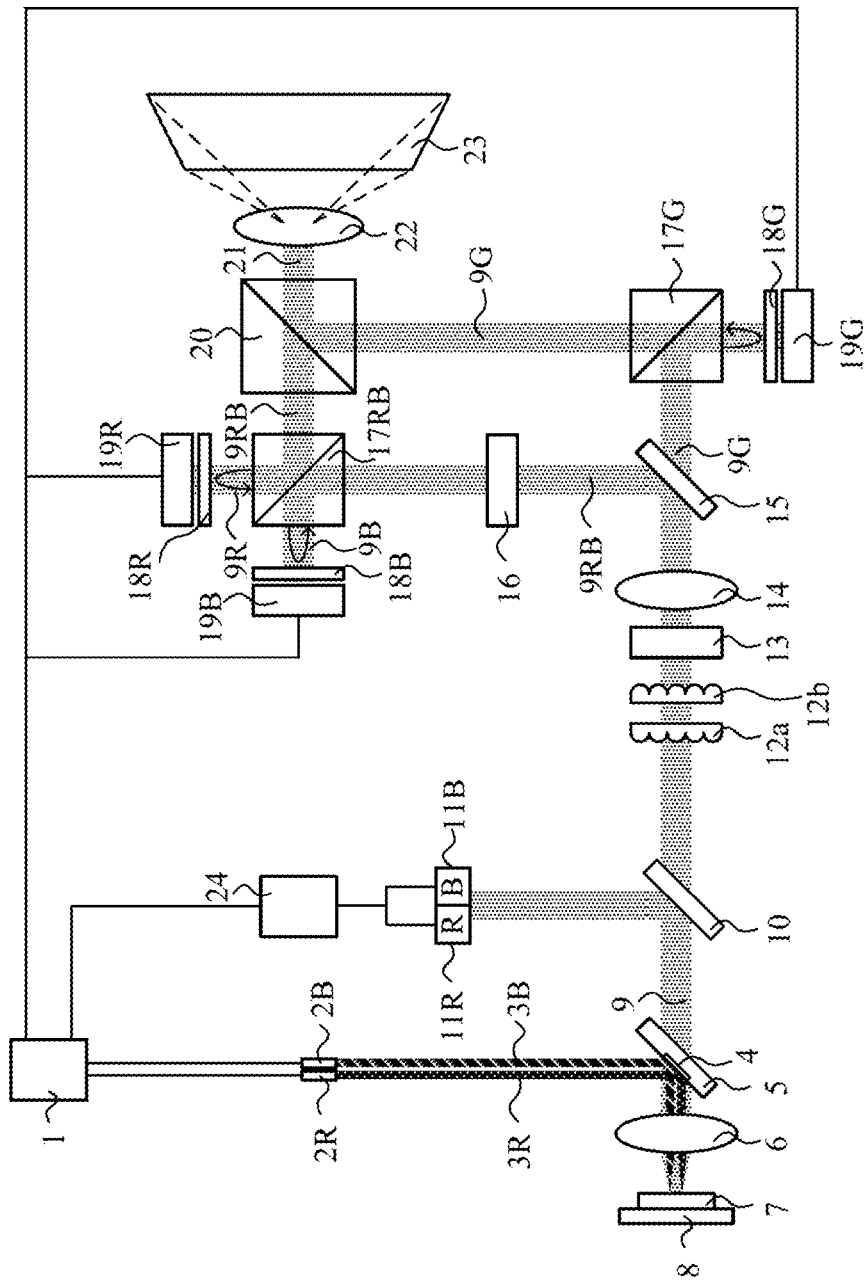
FIG. 5 illustrates a configuration of a projector according to a second embodiment of the present invention.

Referring now to FIG. 5, a description will be given of a configuration of a projector according to a second embodiment of the present invention. The projector according to this embodiment is different from that of the first embodiment (FIG. 1) in having a B light measurement unit (second measurement unit) 11B.

The B light measurement unit 11B is provided in addition to the R light measurement unit 11R and receives part of the illumination light 9 bifurcated by the light dividing member 10. The B light measurement unit 11B measures the light intensity (light quantity) with the wavelength band of 400 nm to 500 nm (second measurement wavelength band). This embodiment does not have a constant ratio of the light quantity of the B light 3B irradiated onto the fluorescent body 7 to the light quantity of the fluorescent light wavelength-converted by the fluorescent body 7, and as the light quantity of the B light 3B becomes larger, the light quantity of the fluorescent light reduces.

Figure 6:
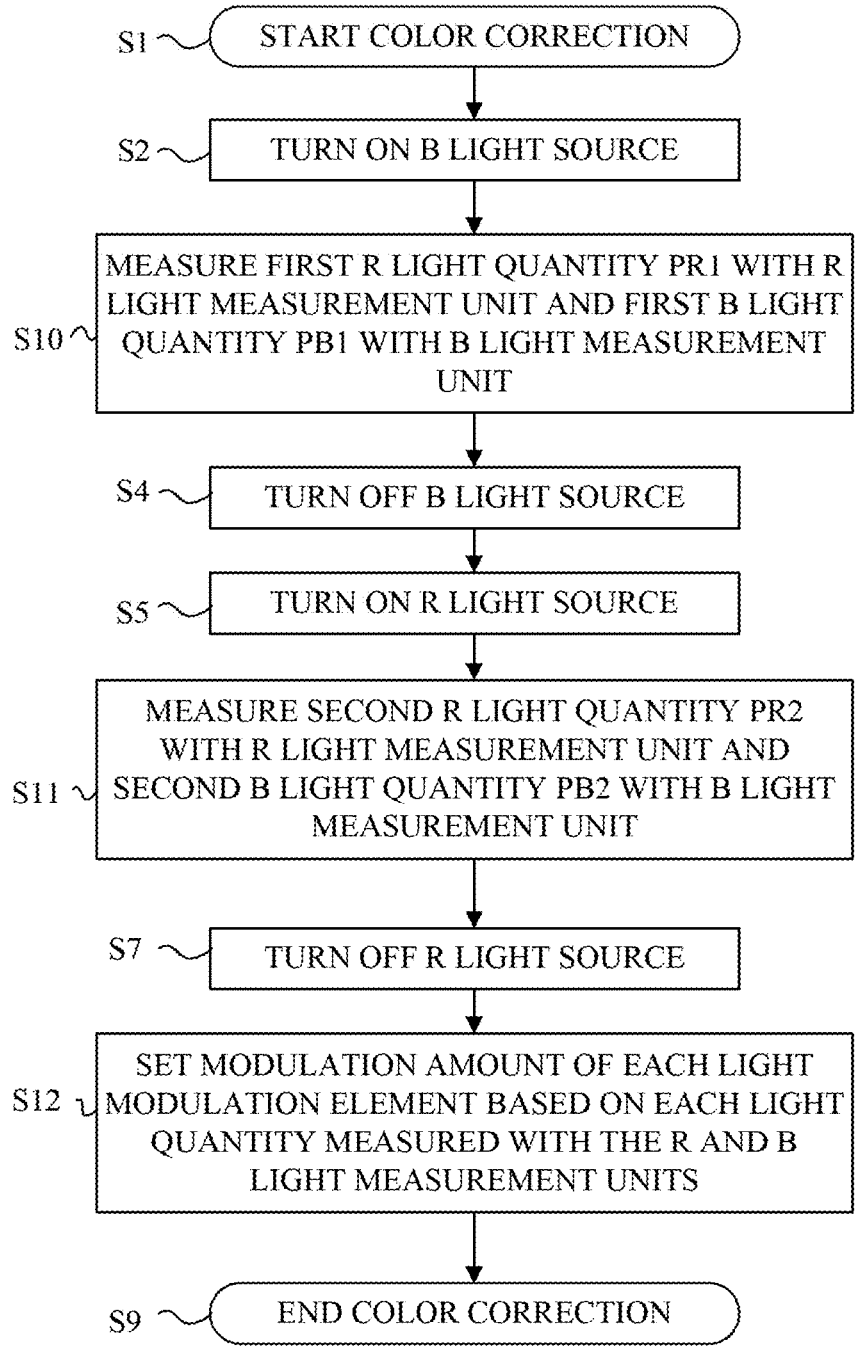
FIG. 6 is a flowchart of processing performed by the projector according to the second embodiment.

The projector (the controller 1 and the calculator 24) according to this embodiment performs the color correction processing illustrated in a flowchart in FIG. 6 for separately measuring the light quantity of the A portion and the light quantity of the B portion. The steps 10, 11, and 12 in FIG. 6 are provided instead of the steps 3, 6, and 8 in the first embodiment (FIG. 4). The steps 1, 2, 4, 5, 7 and 9 in FIG. 6 are the same as those in FIG. 4, and a description thereof will be omitted.

In the step 2, the controller 1 turns on the B light source 2B and turns off the R light source 2R, and in the step 10, the controller 1 transmits the first R light quantity PR1 contained in the projection light 21 to the R light measurement unit 11R and instructs the B light measurement unit 11B to measure the first B light quantity PB1. The first B light quantity PB1 corresponds to the A portion illustrated in FIG. 2B.

The controller 1, which has turned on the R light source 2R in the step 5, instructs the R light measurement section 11R to measure the second R light quantity PR2 and the B light measurement section 11B to measure the second B light quantity PB2 in the step 11. The second R light quantity PR2 corresponds to the B portion illustrated in FIG. 2B.

After turning off the R light source 2R in the step 7, the flow proceeds to the step 12. In the step 12, the calculator 24 sets the light modulation amount of each light modulation element by using the first R light quantity PR1 and the second R light quantity PR2 as the measurement results by the R light measurement unit 11R, and the first B light quantity PB1 and the second B light quantity PB2 as the measurement results by the B light measurement unit 11B.

A detailed description will be given of the processing in which the calculator 24 sets the light modulation amount of each light modulation element in the step 12 of FIG. 6. As described above, this embodiment does not have a constant ratio of the light intensity of the B light 3B applied to the fluorescent body 7 to the light intensity of the fluorescence light wavelength-converted by the fluorescent body 7. Therefore, the calculator 24 calculates the B light quantity contained in the projection light 21, based on the first B light quantity PB1. On the other hand, the ratio of the G light quantity to the fluorescent R light quantity contained in the projection light 21 is constant. Hence, the calculator 24 calculates the G light quantity contained in the projection light 21 based on the first R light quantity PR1. The calculator 24 calculates the fluorescent R light quantity contained in the projection light 21 based on the first R light quantity PR1 and calculates the light source R light quantity contained in the projection light 21 based on the second R light quantity PR2.

Then, using the calculation results (information on the fluorescent R light quantity, the light source R light quantity, the B light quantity, and the G light quantity), the calculator 24 sets the light modulation amount of the light modulation element so that the projection light 21 has the target color balance similarly to the first embodiment.

This embodiment can well adjust (correct) the color balance in the projection light 21 where the ratio of the light quantity of the B light 3B applied to the fluorescent body 7 to the light quantity of the fluorescent light generated from the fluorescent body 7 is not constant.

Third Embodiment

Figure 7:
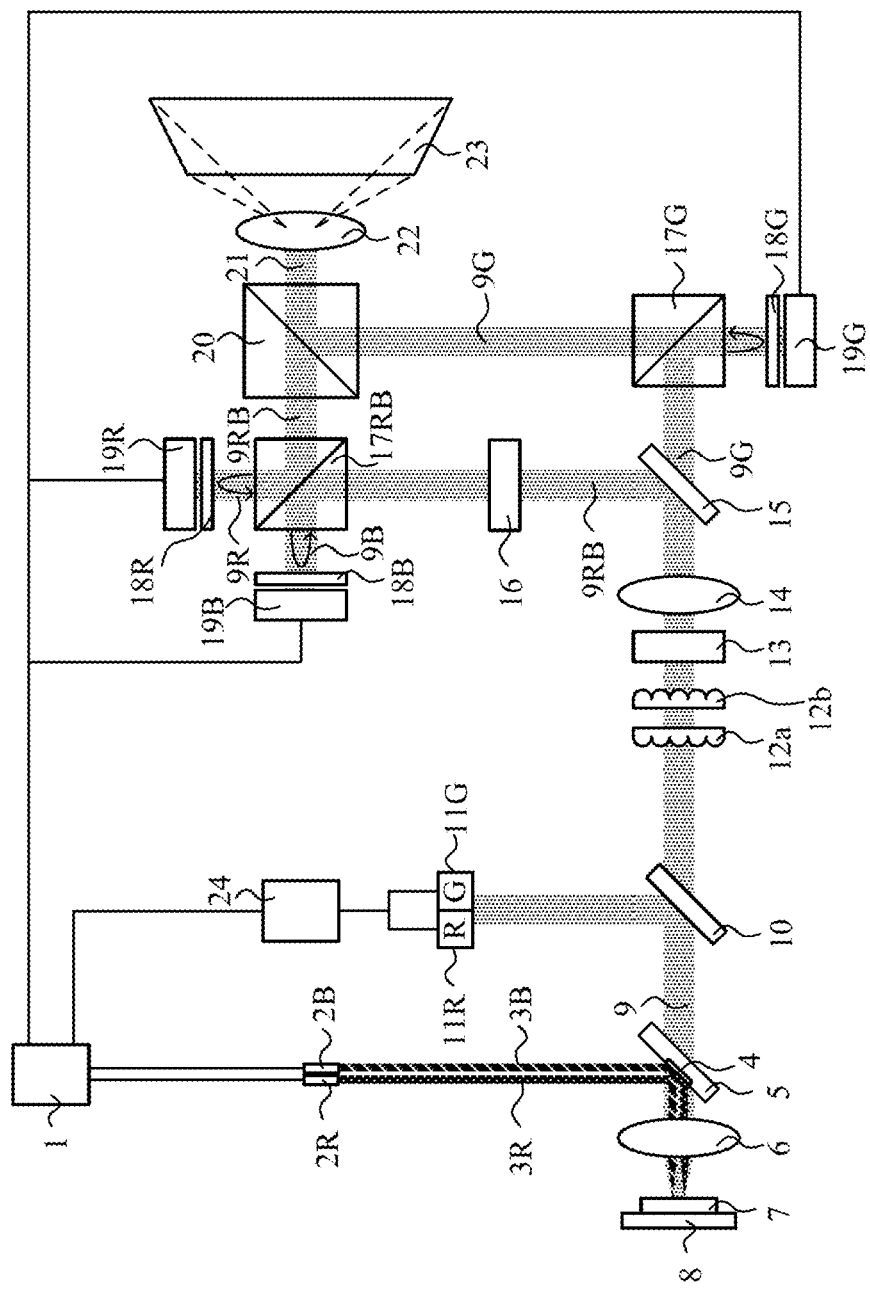
FIG. 7 illustrates a configuration of a projector according to a third embodiment of the present invention.

Referring now to FIG. 7, a description will be given of a configuration of a projector according to a third embodiment of the present invention. The projector according to this embodiment is different from that of the first embodiment (FIG. 1) in having a G light measurement unit (third measurement unit) 11G.

The G light measurement unit 11G is provided in addition to the R light measurement unit 11R and receives part of the illumination light 9 bifurcated by the light dividing member 10. The G light measurement unit 11G measures the light intensity (light quantity) with the wavelength band from 500 nm to 600 nm (third measurement wavelength band). This embodiment has a constant ratio of the light quantity of the B light 3B applied to the fluorescent body 7 to the light quantity of the fluorescence light wavelength-converted by the fluorescent body 7.

Figure 8:
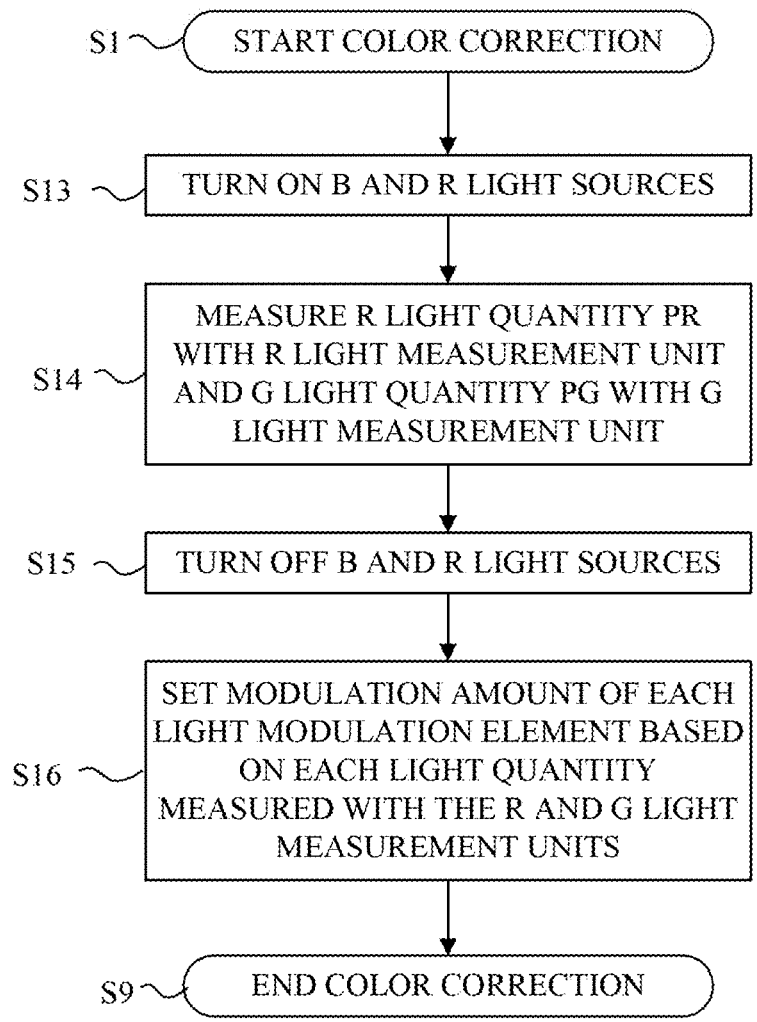
FIG. 8 is a flowchart of processing performed by the projector according to the third embodiment.

The projector (the controller 1 and the calculator 24) according to this embodiment performs the color correction processing illustrated in a flowchart in FIG. 8 for separately measuring the light quantity of the A portion and the light quantity of the B portion.

The controller 1 which has started the color correction processing in the step 1, turns on the B light source 2B and the R light source 2R in the step 13.

Next, in the step 14, the controller 1 instructs the R light measurement unit 11R and the G light measurement unit 11G to measure the R light quantity PR and the G light quantity PG contained in the projection light 21, respectively. The R light quantity PR as the measurement result corresponds to the sum of the A portion and the B portion illustrated in FIG. 2B.

Next, in the step 15, the controller 1 turns off the B light source 2B and the R light source 2R. The step 15 may be omitted.

Next, in the step 16, the calculator 24 sets the light modulation amount of each light modulation element by using each of the R light quantity PR measured by the R light measurement unit 11R and the G light quantity PG measured by the G light measurement unit 11G in the step 14. In this way, the color correction processing ends in the next step 9.

A detailed description will be given of processing in which the calculator 24 sets the light modulation amount of each light modulation element in the step 16 in FIG. 8. Since this embodiment has a constant ratio of the light quantity of the B light 3B irradiated on the fluorescent body 7 to the fluorescent R light quantity, the ratio is constant among the B light quantity, the G light quantity, and the fluorescent R light quantity in the projection light 21. Thus, the calculator 24 calculates the B light quantity and the fluorescent body R light quantity in the projection light 21 based on the measured G light quantity PG. The measured R light quantity PR corresponds to the sum of the fluorescence R light quantity and the light source R light quantity. The calculator 24 calculates the light source R light quantity by subtracting the previously calculated fluorescence R light quantity from the measured R light quantity PR.

Then, using the calculation result (information on the light quantity), the calculator 24 sets the light modulation amount of each light modulation unit so that the projection light 21 has the target color balance similarly to the first embodiment.

This embodiment can well adjust (correct) the color balance by measuring the light quantity of the projection light 21 once, where the ratio of the light quantity of light of the B light 3B applied to the fluorescent body 7 to the light quantity of the fluorescent light generated from the fluorescent body 7 is constant.

Fourth Embodiment

Figure 9:
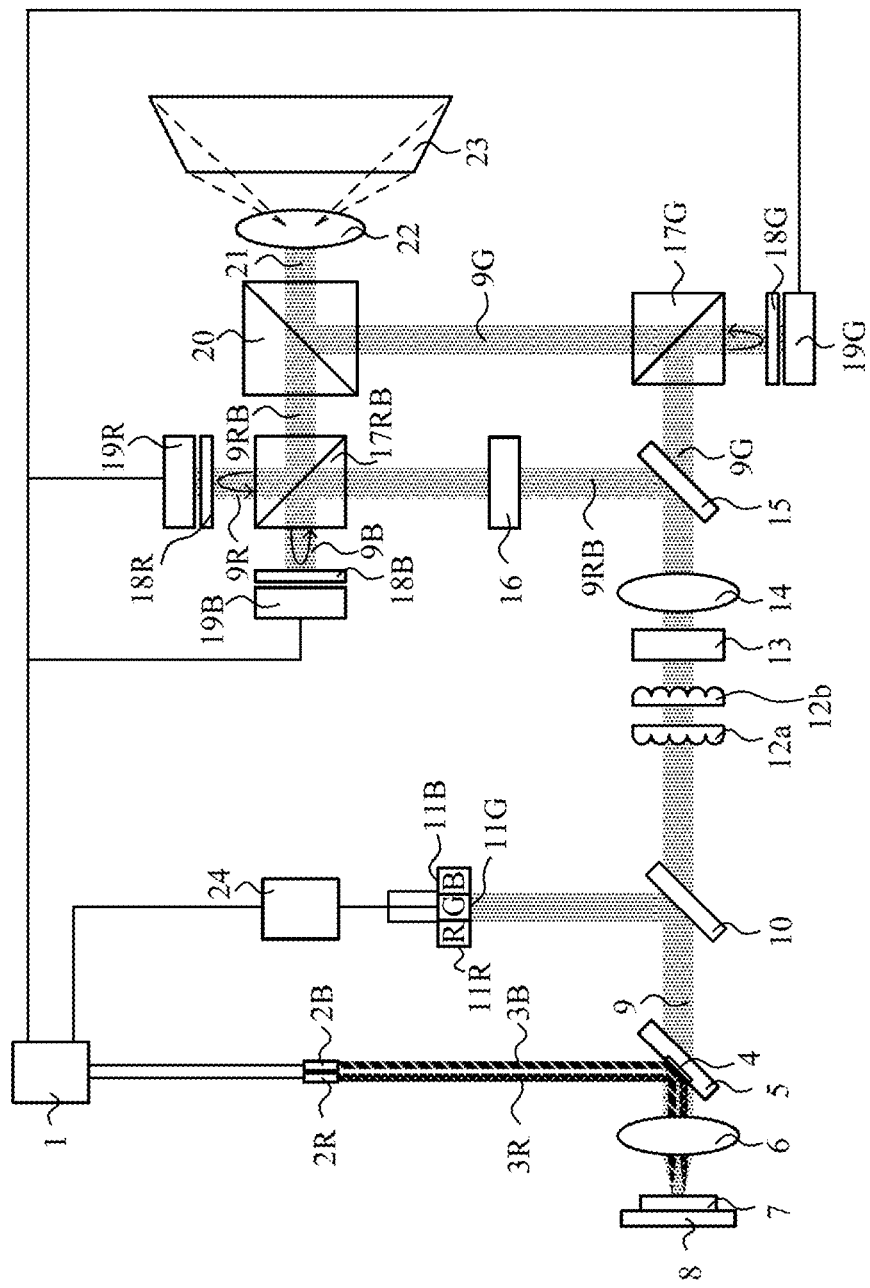
FIG. 9 illustrates a configuration of a projector according to a fourth embodiment of the present invention.

Referring now to FIG. 9, a description will be given of a configuration of a projector according to a fourth embodiment of the present invention. The projector according to this embodiment is different from that of the third embodiment (FIG. 7) in having a B light measurement unit (second measurement unit) 11B.

The B light measurement unit 11B is provided in addition to the G light measurement unit 11G and the R light measurement unit 11R and receives part of the illumination light 9 bifurcated by the light dividing member 10. This embodiment does not have a ratio of the light quantity of the B light 3B irradiated on the fluorescent body 7 to the light quantity of the fluorescent light wavelength-converted by the fluorescent body 7, and as the light quantity of the B light 3B is larger, the light quantity of the fluorescent light becomes smaller.

Figure 10:
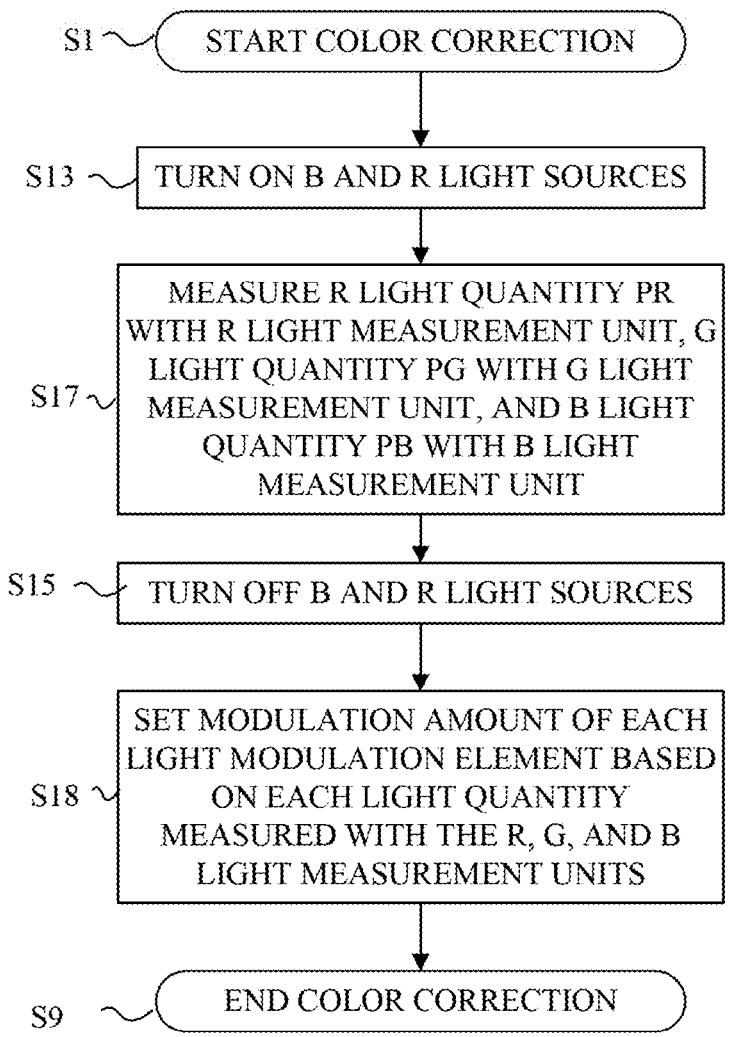
FIG. 10 is a flowchart of processing performed by the projector according to the fourth embodiment.

The projector (the controller 1 and the calculator 24) according to this embodiment performs the color correction processing illustrated in a flowchart in FIG. 10 for separately measuring the light quantity of the A portion and the light quantity of the B portion. Those steps 17 and 18 in FIG. 10 are provided instead of the steps 14 and 16 in the third embodiment (FIG. 8), respectively. The steps 1, 13, 15, and 9 in FIG. 6 are the same as those in FIG. 8, and a description thereof will be omitted.

In the step 17, the controller 1 that has started the color correction processing in the step 1 instructs the R light measurement unit 11R, the G light measurement unit 11G, and the B light measurement unit 11B to measure the R light quantity PR, and the G light quantity PG, and the B light quantity PB. The measured R light quantity PR corresponds to the sum of the portions A and B illustrated in FIG. 2B.

Next, in the step 18, the calculator 24 sets the light modulation amount of each light modulation element by using the R light quantity PR measured by the R light measurement unit 11R, the G light quantity PG6 measured by the G light measurement unit 11G, and the B light quantity PB measured by the B light measurement unit 11B.

A detailed description will be given of processing in which the calculator 24 sets the light modulation amount of each light modulation element in the step 18 in FIG. 10. In this embodiment, the calculator 24 calculates (acquires) the G light quantity contained in the projection light 21 based on the measured G light quantity PG and calculates (obtains) the B light quantity based on the measured B light quantity PB. The ratio of the G light quantity to the fluorescent R light quantity in the projection light 21 is constant. Therefore, the calculator 24 calculates the fluorescence R light quantity in the projection light 21 based on the measured G light quantity PG. The measured R light quantity PR corresponds to the sum of the fluorescence R light quantity and the light source R light quantity. The calculator 24 calculates the light source R light quantity by subtracting the previously calculated fluorescence R light quantity from the measured R light quantity PR.

Then, using the calculation result (information on the light quantity), the calculator 24 sets the light modulation amount of each light modulation unit so that the projection light 21 has the target color balance similarly to the first embodiment.

This embodiment can well adjust (correct) the color balance by measuring the light quantity in the projection light 21 once, where the ratio of the light quantity of the B light 3B applied to the fluorescent body 7 to the light quantity of the fluorescent light generated from the fluorescent body 7 is constant.

This embodiment can well adjust (correct) the color balance of the projection light 21 where the ratio of the quantity of the B light 3B applied to the fluorescent body 7 to the quantity of the fluorescent light generated from the fluorescent body 7 is not constant.

Fifth Embodiment

A description will be given of a projector according to a fifth embodiment of the present invention. The configuration of the projector according to this embodiment is the same as that of the fourth embodiment (FIG. 9), and a description thereof will be omitted.

Figure 11:
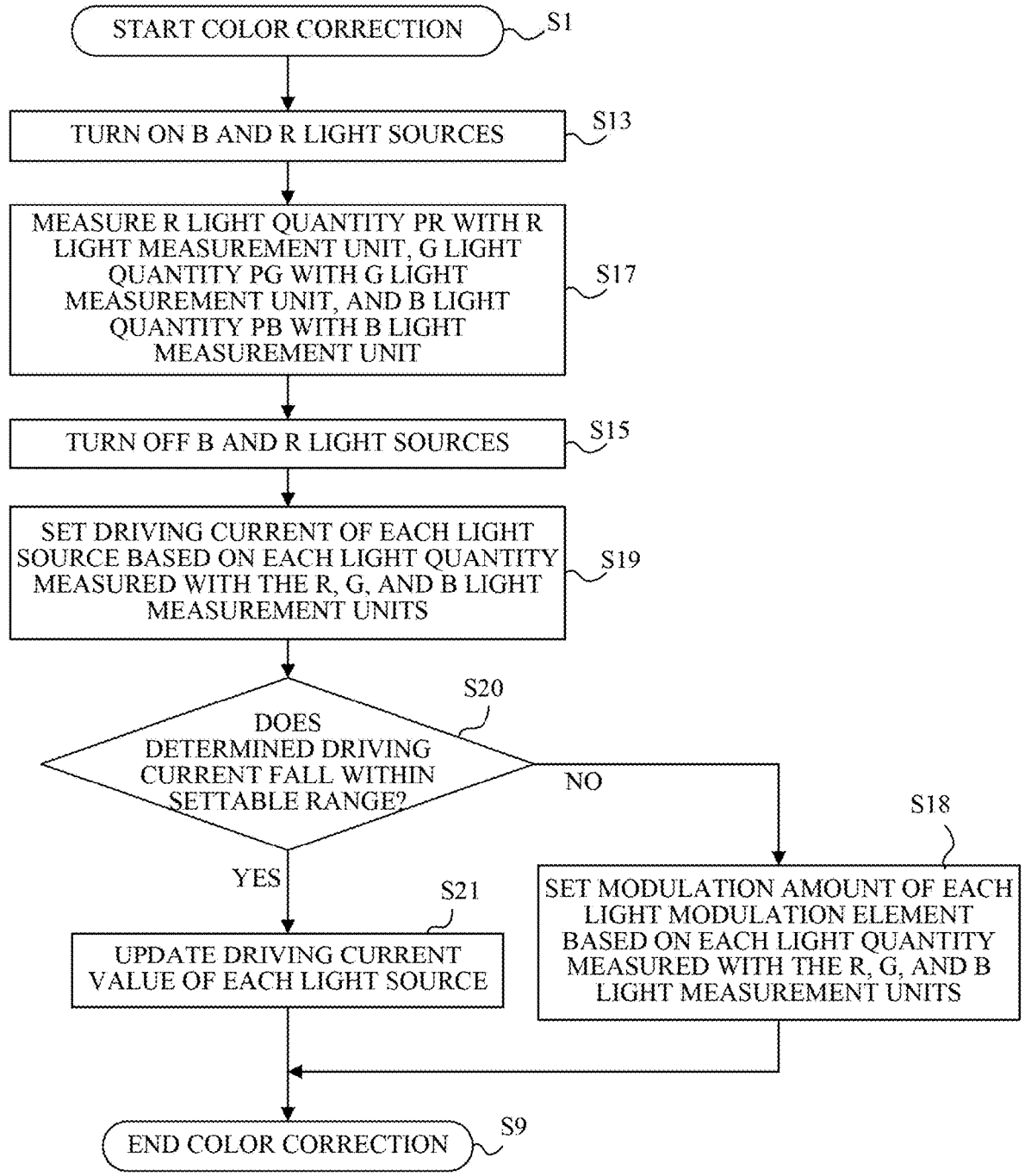
FIG. 11 is a flowchart of processing performed by the projector according to a fifth embodiment of the present invention.

The projector (the controller 1 and the calculator 24) according to this embodiment performs the color correction processing illustrated in a flowchart in FIG. 11 for separately measuring the light quantity of the A portion and the light quantity of the B portion. The flowchart of FIG. 11 adds the steps 19 to 21 to the flowchart according to the fourth embodiment (FIG. 10).

The controller 1 that has measured the light quantity in the step 17 turns off the B light source 2B and the R light source 2R in the step 15.

Next, in the step 19, the calculator 24 calculates the deterioration amount of the light source 2B and the R light source 2R by using the R light quantity, the G light quantity, and the B light quantity measured by each of the R light measurement unit 11R, the G light measurement unit 11G, and the B light measurement unit 11B. Then, the electrification amount (drive current value) supplied to each light source is set so as to supplement the calculated deterioration amount.

Next, in the step 20, the calculator 24 determines whether the set drive current value falls within the settable range. The settable range of the drive current value is predetermined for each light source, and is, for example, in the range of 30 to 100% of the rated current in each light source. When the calculator 24 determines that the set drive current value falls within the settable range in this step, the flow proceeds to the step 21. In the step 21, the controller 1 updates the drive current value supplied to each light source, and then proceeds to the step 9 to end the color correction processing.

On the other hand, if it is determined in the step 20 that the set drive current value does not fall within the settable range, the calculator 24 proceeds to the step 18 also illustrated in FIG. 10. Upon completion of the processing in the step 18, the controller 21 proceeds to the step 9 and ends the color correction processing.

A detailed description will be given of processing in which the calculator 24 sets the drive current value of each light source in the step 19 in FIG. 11. The calculator 24 previously stores the initial values of the B light quantity, the G light quantity, the fluorescent R light quantity, and the light source R light quantity contained in the projection light 21. The calculator 24 calculates the B light quantity, the G light quantity, the fluorescent R light quantity, and the light source R light quantity contained in the projection light 21 by the same processing as in the step 18 in FIG. 10. Then, the calculator 24 calculates the deterioration amount of each light source based on each calculated light quantity and the initial value of each light quantity, and sets the drive current value for each light source so as to correct the calculated deterioration amount.

As described above, when the set drive current value falls within the settable range, the calculator 24 corrects the color balance only by changing the drive current value. On the other hand, when the set drive current value does not fall within the settable range, the calculator 24 corrects the color balance by changing the light modulation amount of each light modulation element.

This embodiment can provide a correction so as to maintain constant the brightness of the projection light as well as correcting the color balance correction of the projection light, by correcting the drive current value for each light source.

Variation

Each of the above embodiments describes calculating each color light quantity contained in the projected light, but may calculate or acquire the ratio or ratio of each color light quantity as information on the light quantity.

The light modulation amount may be set by referring to table data showing the light modulation amount of each light modulation element based on the measurement result by the R light measurement unit.

The range of color balance that can be regarded as normal may be predetermined, and the color balance may be corrected when the color balance deviates from the normal range.

The position of each light measurement unit is not limited to that illustrated in each embodiment, and may be any position as long as it can be used to detect the color in the projection light.

The projector according to each embodiment is configured to irradiate the R light from the R light source onto the fluorescent body, but the present invention is not limited to this example and the R light from the R light source may be combined with the illumination light.

Each of the embodiments discusses use of the R light source, but may use a light source of another color as long as it is a light source that emits a wavelength contained in the wavelength band of the fluorescent light from the fluorescent body.

Each of the embodiments can well correct the lost color balance caused by the deteriorated first or second light source, etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-227641, filed on Nov. 28, 2017 which is hereby incorporated by reference herein in its entirety.

What is claimed is:

1. An image projection apparatus configured to project a projection image derived from modulated light, the image projection apparatus comprising:
    a first light source configured to emit first light with a first wavelength band;
    a fluorescent material configured to convert part of the first light into fluorescent light with a wavelength band different from the first wavelength band and containing a second wavelength band;
    a second light source configured to emit second light with a wavelength band contained in the second wavelength band;
    a light modulator configured to provide the modulated light by modulating light from the first light source and the second light source;
    a first light-quantity sensor configured to measure a light quantity in a first measurement wavelength band including at least part of the second wavelength band; and
    a controller configured to acquire respectively first information on a light quantity in the second wavelength band obtained by converting part of the first light by the fluorescent material, and second information on a light quantity in the second wavelength band emitted by the second light source, by using a measurement result of the first light-quantity sensor, and to control a light modulation amount of the light modulator by using the first information and the second information.

2. The image projection apparatus according to claim 1, wherein the controller controls a color balance between the first light and the second light in the projection image by using the first information and the second information.

3. The image projection apparatus according to claim 1, wherein the controller controls an electrification amount supplied to the first and second light sources by using the first information and the second information.

4. The image projection apparatus according to claim 1, wherein the controller acquires the first information and the second information based on a result of a first measurement for measuring the light quantity with the first light-quantity sensor when the first light source emits the first light and the second light source does not emit the second light, and a result of a second measurement for measuring the light quantity with the first light-quantity sensor when the first light source does not emit the first light and the second light source emits the second light.

5. The image projection apparatus according to claim 1, wherein the controller acquires the first information and the second information based on a result of a first measurement for measuring the light quantity with the first light-quantity sensor when the first light source emits the first light and the second light source emits the second light, and a result of a second measurement for measuring the light quantity with the first light-quantity sensor when an electrification amount of at least one of the first light source and the second light source is different from that of the first measurement.

6. The image projection apparatus according to claim 1, further comprising a second light-quantity sensor configured to measure the light quantity in a second measurement wavelength band that is at least part of the first wavelength band,
    wherein the controller acquires the first information and the second information by using measurement results of the first light-quantity sensor and the second light-quantity sensor.

7. The image projection apparatus according to claim 1, wherein the wavelength-converted light contains a third wavelength band different from the first wavelength band and the second wavelength band,
    wherein the image projection apparatus further comprises a third light-quantity sensor configured to measure a light quantity with a third measurement wavelength band that is at least part of the third wavelength band, and
    wherein the controller acquires the first information and the second information by using measurement results of the first light-quantity sensor and the third light-quantity sensor.

8. The image projection apparatus according to claim 1, wherein the wavelength-converted light includes a third wavelength band different from the first wavelength band and the second wavelength band,
    wherein the image projection apparatus further comprises a second light-quantity sensor configured to measure a light quantity with a second measurement wavelength band that is at least part of the first wavelength band, and a third light-quantity sensor configured to measure a light quantity of third measurement wavelength band that is at least part of the third wavelength band, and
    wherein the controller acquires the first information and the second information by using measurement results of the first light-quantity sensor, the second light-quantity sensor, and the third light-quantity sensor.

9. A control method for an image projection apparatus including a first light source configured to emit first light with a first wavelength band, a fluorescent material configured to convert part of the first light into fluorescent light with a wavelength band different from the first wavelength band and containing a second wavelength band, a second light source configured to emit second light with a wavelength band contained in the second wavelength band, and a light modulator configured to modulate light from the first light source and the second light source, the control method comprising:

a measurement step of measuring a light quantity in a first measurement wavelength band including at least part of the second wavelength band;

an acquisition step of acquiring respectively first information on a light quantity in the second wavelength band obtained by converting part of the first light by the fluorescent material, and second information on a light quantity in the second wavelength band emitted by the second light source, by using a measurement result of the measurement step; and a control step of controlling a light modulation amount of the light modulator by using the first information and the second information.

10. The control method according to claim 9, wherein the control step controls a color balance between the first light and the second light in the projection image by using the first information and the second information.

11. The control method according to claim 10, wherein the control step controls a light modulation amount of the light modulator.

12. The control method according to claim 10, wherein the control step controls an electrification amount supplied to the first and second light sources.

13. A non-transitory computer readable storage medium for storing a computer program that enables a computer to execute a control method for an image projection apparatus including a first light source configured to emit first light with a first wavelength band, a fluorescent material configured to convert part of the first light into fluorescent light with a wavelength band different from the first wavelength band and containing a second wavelength band, a second light source configured to emit second light with a wavelength band contained in the second wavelength band, and a light modulator configured to modulate light from the first light source and the second light source, the control method comprising:

a measurement step of measuring a light quantity in a first measurement wavelength band including at least part of the second wavelength band;

an acquisition step of acquiring respectively first information on a light quantity in the second wavelength band obtained by converting part of the first light by the fluorescent material, and second information on a light quantity in the second wavelength band emitted by the second light source, by using a measurement result of the measurement step; and a control step of controlling a light modulation amount of the light modulator by using the first information and the second information.

14. The storage medium according to claim 13, wherein the control step controls a color balance between the first light and the second light in the projection image by using the first information and the second information.

15. The storage medium according to claim 14, wherein the control step controls a light modulation amount of the light modulator.

16. The storage medium according to claim 14, wherein the control step controls an electrification amount supplied to the first and second light sources.

* * * * *